(12) United States Patent
Bowness et al.

(10) Patent No.: US 11,720,660 B2
(45) Date of Patent: Aug. 8, 2023

(54) TEMPORARY PARTIAL AUTHENTICATION VALUE PROVISIONING FOR OFFLINE AUTHENTICATION

(71) Applicant: EMC IP Holding Company LLC, Hopkinton, MA (US)

(72) Inventors: Piers Bowness, Boxborough, MA (US); Salah E. Machani, Medford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 768 days.

(21) Appl. No.: 16/259,357

(22) Filed: Jan. 28, 2019

(65) Prior Publication Data
US 2020/0242227 A1 Jul. 30, 2020

(51) Int. Cl.
*G06F 21/34* (2013.01)
*G06F 21/33* (2013.01)
*G06F 21/60* (2013.01)
*H04L 9/40* (2022.01)

(52) U.S. Cl.
CPC ............ *G06F 21/34* (2013.01); *G06F 21/335* (2013.01); *G06F 21/602* (2013.01); *G06F 21/604* (2013.01); *H04L 63/0428* (2013.01); *H04L 63/0853* (2013.01); *G06F 2221/2137* (2013.01); *G06F 2221/2153* (2013.01)

(58) Field of Classification Search
CPC ........ G06F 21/31; G06F 21/335; G06F 21/34; G06F 21/602; G06F 21/604; G06F 21/62; G06F 21/6209; G06F 21/6218; G06F 2221/2137; G06F 2221/2153; H04L 63/10; H04L 63/20; H04L 63/0428; H04L 63/0838; H04L 63/0846; H04L 63/0853; H04L 9/32; H04L 9/321; H04L 9/3226; H04L 9/3228
See application file for complete search history.

(56) References Cited

U.S. PATENT DOCUMENTS

| | | |
|---|---|---|
| 7,971,234 B1 | 6/2011 | Sussland et al. |
| 8,966,276 B2 | 2/2015 | Nanopoulos et al. |
| 9,043,605 B1 | 5/2015 | Machani |
| 9,154,304 B1 * | 10/2015 | Dotan ................... H04L 9/3234 |
| 9,172,683 B2 | 10/2015 | Farrugia et al. |

(Continued)

*Primary Examiner* — Jeremy S Duffield
(74) *Attorney, Agent, or Firm* — Ryan, Mason & Lewis, LLP

(57) ABSTRACT

Methods, apparatus, and processor-readable storage media for temporary partial authentication value provisioning for offline authentication are provided herein. An example computer-implemented method includes generating, in response to a request from an access device, an intermediary set of cryptographic information from an initial set of cryptographic information; modifying the intermediary set of cryptographic information based at least in part on data pertaining to the access device and one or more security parameters, wherein modifying the intermediary set of cryptographic information comprises removing one or more items of the cryptographic information from the intermediary set; and transmitting, over a network connection, the modified intermediary set of cryptographic information to the access device for use in a subsequent offline authentication request.

20 Claims, 5 Drawing Sheets

(56) References Cited

U.S. PATENT DOCUMENTS

| | | | |
|---|---|---|---|
| 2005/0166263 A1* | 7/2005 | Nanopoulos | H04L 9/3228 726/7 |
| 2007/0157300 A1* | 7/2007 | Sivaradjane | H04L 63/1458 726/9 |
| 2009/0300738 A1 | 12/2009 | Dewe et al. | |
| 2012/0174196 A1* | 7/2012 | Bhogavilli | H04L 63/1416 726/5 |
| 2013/0185778 A1* | 7/2013 | Tamai | H04L 63/08 726/6 |
| 2015/0082399 A1* | 3/2015 | Wu | H04L 9/0897 726/10 |
| 2016/0352516 A1* | 12/2016 | Oberheide | H04L 9/0897 |
| 2017/0374070 A1* | 12/2017 | Shah | H04L 63/105 |
| 2019/0190904 A1* | 6/2019 | Chen | H04L 63/18 |
| 2019/0205512 A1* | 7/2019 | Franco | G06F 21/554 |

* cited by examiner

TEMPORARY PARTIAL AUTHENTICATION VALUE PROVISIONING FOR OFFLINE AUTHENTICATION

FIELD

The field relates generally to information processing systems, and more particularly to techniques for providing security in such systems.

BACKGROUND

In order to gain access to applications or other resources via a computer or another user device, users are often required to authenticate themselves by entering authentication information. Such authentication information may include, for example, passwords, responses to one or more challenge questions, or other forms of cryptographic or authentication information (including one-time passwords (OTPs), biometric mechanisms, etc.).

An OTP, for example, is a single-use value that is typically generated by an authentication device such as a hardware token or a mobile device running a software application (accessible by a limited number of users). By way of further example, in a two-factor authentication flow, the OTP value is commonly used in conjunction with a password or a personal identification number (PIN), which the user of the token or device enters as a means of demonstrating that the user is in possession of the token or device at the time of authentication. Generally, such use of OTPs requires access to a remote authentication service to verify the value (that is, the password or PIN) provided by the user. However, there are situations when the token or device that the user is using to access the protected resource is disconnected from the relevant network (or otherwise offline) and cannot reach the remote authentication service.

SUMMARY

Illustrative embodiments of the disclosure provide techniques for temporary partial authentication value provisioning for offline authentication. An exemplary computer-implemented method includes generating, in response to a request from an access device, an intermediary set of cryptographic information from an initial set of cryptographic information, wherein the intermediary set of cryptographic information comprises a portion of the initial set of cryptographic information and is temporally-limited in accordance with at least one predetermined unit of time. Such a method also includes modifying the intermediary set of cryptographic information based at least in part on data pertaining to the access device and one or more security parameters, wherein modifying the intermediary set of cryptographic information comprises removing one or more items of the cryptographic information from the intermediary set. Further, such a method includes transmitting, over a network connection, the modified intermediary set of cryptographic information to the access device for use in a subsequent offline authentication request.

Another exemplary computer-implemented method includes transmitting a request, to an authentication server over a network connection, for a set of cryptographic information, wherein the set of cryptographic information comprises a temporally-limited partial subset of an initial set of cryptographic information, wherein one or more items of cryptographic information have been removed from the temporally-limited subset. Such a method additionally includes receiving the set of cryptographic information in response to a successful authentication associated with the transmitted request, and generating a complete version of the set of cryptographic information by computing the one or more items of cryptographic information that had been removed from the temporally-limited subset. Further, such a method includes implementing the complete version of the set of cryptographic information in connection with an offline authentication request to access a protected resource.

Illustrative embodiments can provide significant advantages relative to conventional OTP-based authentication techniques. For example, challenges associated with a lack of connectivity with a remote authentication service are overcome through generating and implementing an intermediary key for validating an OTP value on a user's access device while that device may be unable to connect to the remote service. Such an intermediary key approach eliminates the connectivity requirement and reduces the amount of data to be transferred between the access device and the authentication service and/or server.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
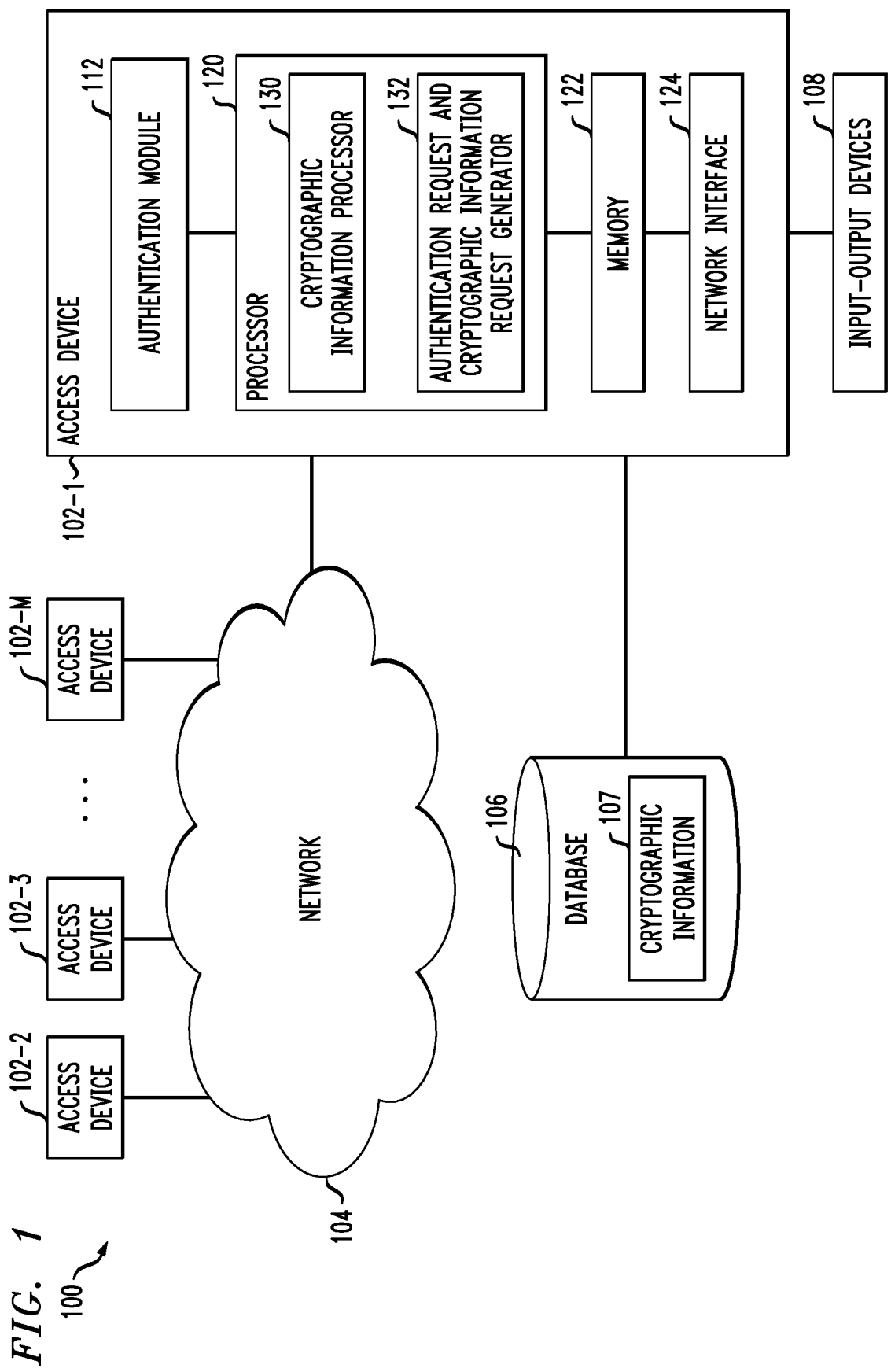
FIG. 1 shows an information processing system configured for temporary partial authentication value provisioning for offline authentication in an illustrative embodiment.

FIG. 1 shows a computer network (also referred to herein as an information processing system) 100 configured in accordance with an illustrative embodiment. The computer network 100 comprises a plurality of access devices 102-1, 102-2, 102-3, . . . 102-M, collectively referred to herein as access devices 102. The access devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment.

The access devices 102 may comprise, for example, mobile telephones, laptop computers, tablet computers, desktop computers or other types of computing devices. Such devices are examples of what are more generally referred to herein as "processing devices" or "computing devices." Some of these devices are also generally referred to herein as "computers."

The access devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, one or more of the access devices 102 can have an associated database 106 configured to store data 107 pertaining to cryptographic information associated with authentication events, which may comprise, for example, authentication data or other types of data including master cryptographic information, intermediary cryptographic information, and other information associated with authentication events.

The database 106 in the present embodiment is implemented using one or more storage systems associated with access devices 102. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the access devices 102 are input-output devices 108, which illustratively comprise keyboards, displays or other types of input-output devices in any combination. Such input-output devices can be used, for example, to support one or more user interfaces to access devices 102, as well as to support communication between access devices 102 and other related systems and devices not explicitly shown.

As also depicted in the example embodiment detailed in FIG. 1, access devices 102 comprise an authentication module 112. The authentication module 112 determines if a given access attempt is authentic based on presentation of one or more predetermined authentication factors such as user identifiers, passwords or other cryptographic information (as further detailed herein). Upon verification of the presented authentication factors, the authentication module 112 grants the requesting access device 102 access to one or more protected resources of the computer network 100.

Figure 2:
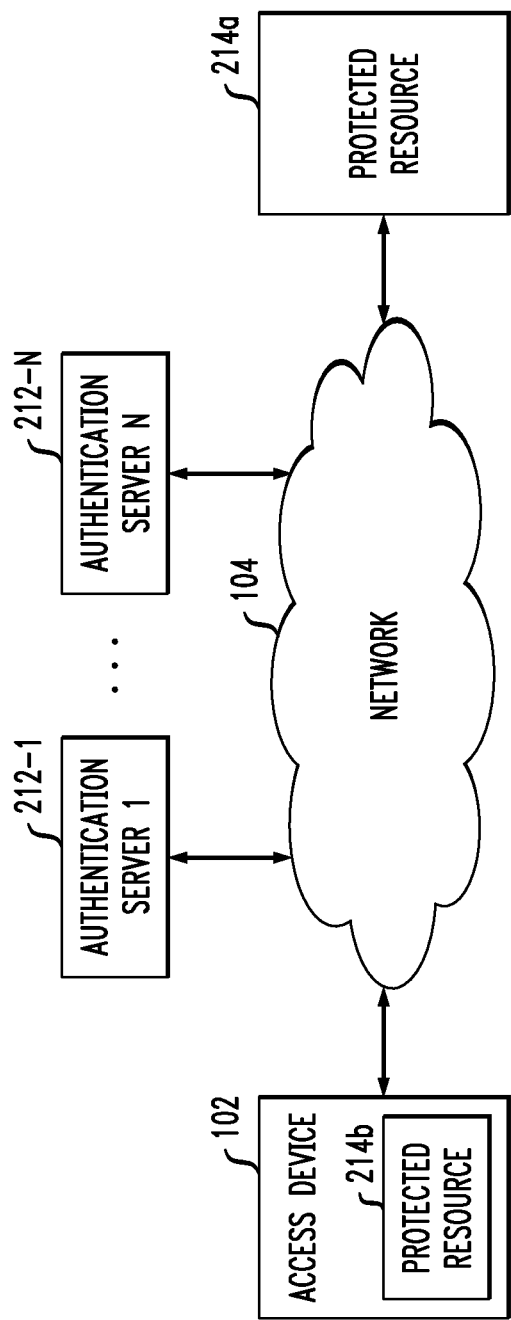
FIG. 2 shows another information processing system configured for temporary partial authentication value provisioning for offline authentication in an illustrative embodiment.

Although shown as an element of the access devices 102 in this embodiment, the authentication module 112 in other embodiments can be implemented at least in part externally to the access device 102, for example, as a stand-alone server, set of servers or other type of authentication system coupled to the network 104 (such as depicted in FIG. 2, for example).

Each access device 102 in the FIG. 1 embodiment is assumed to be implemented using at least one processing device. Each such processing device generally comprises at least one processor and an associated memory, and implements one or more functional modules for controlling certain features of the access device 102.

More particularly, access devices 102 in this embodiment each can comprise a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the access devices 102 to communicate over the network 104 with the other access devices 102, and illustratively comprises one or more conventional transceivers.

The processor 120 further comprises a cryptographic information processor 130 and an authentication request and cryptographic information request generator 132.

It is to be appreciated that this particular arrangement of modules 130 and 132 illustrated in the processor 120 of the FIG. 1 embodiment is presented by way of example only, and alternative arrangements can be used in other embodiments. For example, the functionality associated with the modules 130 and 132 in other embodiments can be combined into a single module, or separated across a larger number of modules. As another example, multiple distinct processors can be used to implement different ones of the modules 130 and 132 or portions thereof.

At least portions of the cryptographic information processor 130 and authentication request and cryptographic information request generator 132 may be implemented at least in part in the form of software that is stored in memory 122 and executed by processor 120. Similarly, at least portions of the authentication module 112 of access devices 102 can be implemented at least in part in the form of software that is stored in memory 122 and executed by processor 120.

It is to be understood that the particular set of elements shown in FIG. 1 for temporary partial authentication value provisioning for offline authentication involving access devices 102 of computer network 100 is presented by way of illustrative example only, and in other embodiments additional or alternative elements may be used. Thus, another embodiment may include additional or alternative systems, devices and other network entities, as well as different arrangements of modules and other components.

An exemplary process utilizing cryptographic information processor 130 and authentication request and cryptographic information request generator 132 of an example access device 102 in computer network 100 will be described in more detail with reference to the flow diagrams of FIG. 4 and FIG. 5.

FIG. 2 is a system diagram of an illustrative embodiment. By way of illustration, FIG. 2 depicts an alternative embodiment to FIG. 1, wherein authentication server(s) 212 is/are not resident on the access device(s) 102, but rather are separate devices. Accordingly, as depicted in FIG. 2, access device 102 communicates with a protected resource 214*a* over network 104. As also illustrated in FIG. 2, at least one embodiment can include access device 102 that includes protected resource 214*b* residing thereon. In an example implementation, a user authenticates online with one or more authentication servers 212-1 through 212-N (hereinafter, collectively referred to as authentication servers 212) before obtaining access to protected resource 214*a* and/or 214*b* (hereinafter, collectively referred to as protected resource 214 unless otherwise specified).

According to one aspect of the disclosure, as noted above, the user of the access device 102 is authenticated by authentication servers 212 using a password, challenge questions, and/or other forms of cryptographic information. The exemplary communications among the system elements 102, 104 and 214 of FIG. 2 to achieve authentication by the authentication servers 212 are discussed further below.

It is to be appreciated that a given embodiment of the disclosed system may include multiple instances of access device 102 and protected resource 214, and possibly other system components, although the instances of such components shown in the simplified system diagram of FIG. 2 are as such for clarity of illustration.

As noted herein, access device 102 may represent a portable device, such as a mobile telephone, personal digital assistant (PDA), wireless email device, game console, etc. The access device 102 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The access device 102 may also be referred to herein as a user device or simply a "user." The term "user," as used in this context, should be understood to encompass, by way of example and without limitation, a user device or access device, a person utilizing or otherwise associated with the device, or a combination of both. An operation described herein as being performed by a user may therefore, for example, be performed by a user device or access device, a person utilizing or otherwise associated with the device, or by a combination of both the person and the device. Similarly, a password, challenge question, or other cryptographic information described as being associated with a user may, for example, be associated with an access device 102, a person utilizing or otherwise associated with the device, or a combination of both the person and the device.

As also depicted in FIG. 2, the authentication servers 212 can be associated with a third-party entity, such as an authentication authority, that processes authentication requests on behalf of web servers and other resources, as well as verifies the cryptographic information that is presented by an access device 102.

Further, the protected resource 214 may be, for example, an access-controlled application, web site or hardware device. In other words, a protected resource 214 is a resource that grants user access responsive to an authentication process, as will be described in greater detail below. For example, protected resource 214*a* may include an access-controlled file, e-mail, a protected application, a remote application server such as a web site or other software program or hardware device that is accessed by the access device 102 over a network 104.

Additionally, in at least one embodiment, protected resource 214*b* can include one or more applications or data residing on the access device 102 itself. For example, such a protected resource 214*b* can include access to a mobile data management container for launching applications on the access device 102 (such as a mobile device), which can be protected requiring authentication in order to run the application(s) protected by the container. Further, protected resource 214*b* could also include an access-controlled file, e-mail, a protected application, a remote application server such as a web site or other software program or hardware device that is accessed by the access device 102 over network 104. Similarly, it is possible that in order to unlock the mobile platform to perform operations, a successful authentication might be required.

In at least one embodiment of the invention, the user's device (access device) is not trusted to store long-lived token seeds, but is sufficiently trusted to store short-lived partial token seeds. For example, the access device can be a managed-device with built-in security controls that can prevent rogue applications from running on it in privileged mode and/or access other application data stores and key stores. Accordingly, such an embodiment includes replacing the complete hash-table generation approach or the cloning of the long-lived seed in the local user's access device with a mechanism that provides the client with a partial, intermediary, short-lived token seed value.

By way merely of illustration, consider an authentication algorithm that uses an initial (master) cryptographic (seed) value, data generated from the access device's serial number, and one or more additional proprietary values to create a set of five Advanced Encryption Standard (AES) keys. The five AES keys are used at various intervals during the OTP generation process. These intervals correspond with each year, month, day, hour, and minute during which the token is operating. As each AES key is derived from a prior key, this can be thought of as a "tree" of keys. Any of the five keys derived from this process is referred to as an "intermediary key" and is only valid for a limited period of time.

Accordingly, at least one embodiment includes implementing an alternate mechanism to the hash-table approach by replacing this information with a portion of an intermediary key (also referred to herein as cryptographic information or "seed"). The specific intermediary seed can be selected according to the desired security properties of the solution.

In one or more embodiments, the local authentication service (LAS) (such as authentication module 112) on the end-user's access device would receive the partial, intermediary seed along with information about the missing portion (e.g., the number of bits missing, etc.). The LAS would use the partial seed information to compute the missing seed-bits, allowing the service to validate the OTP entered by the user. A compromise of the data stored on the LAS would only yield partial (intermediary) seeds, which are insufficient for the adversary to complete OTP generation. An adversary could use the data but would be required to try authentications with up to 2N OTP values (which will generally trigger other mitigations for user lockout due to authentication failures).

Accordingly, such an embodiment provides a value with a limited useful lifetime (i.e., an intermediary seed) and blinds and/or removes a portion of that seed data. This requires the client to perform work to compute the missing seed bits. The overall security of the mechanism increases with the number of blinded and/or removed bits. Additionally, the number of bits removed from the master/initial seed (to generate the intermediary seed) can be adjusted based at least in part on the computational power of the end-user's system.

In one or more embodiments, intermediary seed selection can depend on the level of risk that the administrator was willing to tolerate. For example, if a monthly seed was uploaded to a user's access device, a compromise of the local data may result in exposure of data that would increase the risk that an adversary could generate OTPs for the remainder of the month (i.e., the month associated with the compromised seed). As an alternative, the access device can be configured to provide the LAS with multiple daily seeds for each offline day. In all cases, the data would only reduce the seed search space and would have no impact on the other factor (i.e., the user's personal identification number (PIN)). In such an embodiment, the server would provide the LAS with the user's PIN as a separate salted, hashed value. Alternatively, a year of offline authentication data could be represented in an extremely small amount of data (providing a yearly seed).

Also, in at least one embodiment, the short-lived (intermediary) seed is derived by the server from the long-lived (master) seed, the current time and additional data. Such additional data may include a token or access device serial number (SN) or part of the SN. The current time can be represented, for example, as the current month or the current day. In such an embodiment, as noted herein, a hierarchy of time-based seed values, wherein each such value is derived from a predecessor, is used. The "master" seed, generated at the device's (or token's) inception, is used, for example, once-per-year to generate a yearly seed. Each yearly seed can then be used on a monthly basis to generate a monthly seed, and each monthly seed can be used on a daily basis to generate a daily seed. Further, in such an example, each daily seed is used on an hourly basis to generate an hourly seed, and an hourly seed is used every minute to generate an OTP. For a 60-second token, for example, an adversary can gather, at most, 60 OTPs before the current hourly seed is discarded and a new hourly seed is generated (from the daily seed).

In one or more embodiments, to allow the LAS to compute the user's OTP for offline/disconnected authentication, the intermediary seed can be either a monthly seed or a daily seed. The next monthly seed or the next daily seed will be generated before the expiry of the current monthly or current daily seed. After the intermediary seed is generated, the server clears or "blinds" some bits of the seed (hiding the complete seed value). For example, the server might clear the 25 most significant bits. To verify an OTP in a standard, small, time-based authentication window (i.e., intervals −1, 0, +1) would require the LAS to potentially generate approximately 12.5 million OTPs. For extended offline use-cases, one or more embodiments can include using a yearly intermediary seed value.

Figure 3:
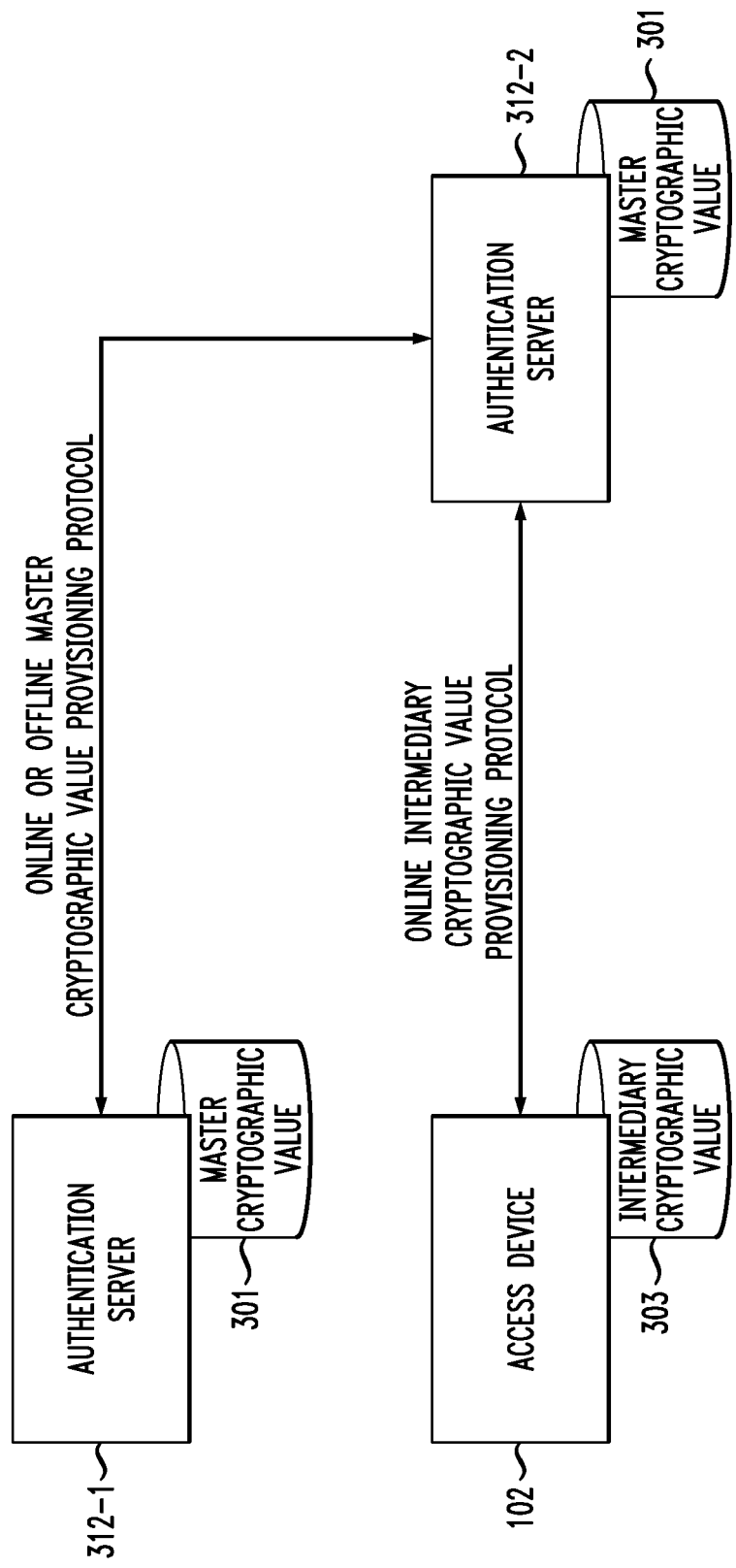
FIG. 3 shows master cryptographic value and intermediary cryptographic value provisioning protocols in an illustrative embodiment.

FIG. 3 shows master cryptographic value and intermediary cryptographic value provisioning protocols in an illustrative embodiment. FIG. 3 illustrates an overall authentication system architecture (including authentication server 312-1, authentication server 312-2, and access device 102) and context of provisioning protocols for the master cryptographic value 301 (also referred to herein as the master seed) and the intermediary cryptographic value 303 (also referred to herein as the intermediary seed).

As illustrated, the master cryptographic value 301 is generated and provisioned (by authentication server 312-1) onto authentication server 312-2 using one or more techniques, including online seed provisioning protocols, offline methods such as file import, or integration into the device/server at manufacturing time. The intermediary cryptographic value 303 can be provisioned to the user's access device 102 using an online encryption protocol (such as an online key-transport protocol, for example) between authentication server 312-2 and the access device 102. Retrieval of the intermediary cryptographic value 303 for offline authentication may be authorized, for example, by means of a user authentication. Authentication server 312-1 derives the intermediary cryptographic value 303 from the master cryptographic value 301 (and other data) and sends the intermediary cryptographic value 303 to the LAS running on user's access device 102. This cryptographic information data may be encrypted using some mechanism local to the access device 102.

Additionally, the LAS may utilize user authentications or other authorization mechanisms to request subsequent intermediary seed values (for the next day, the next month, etc.).

Figure 4:
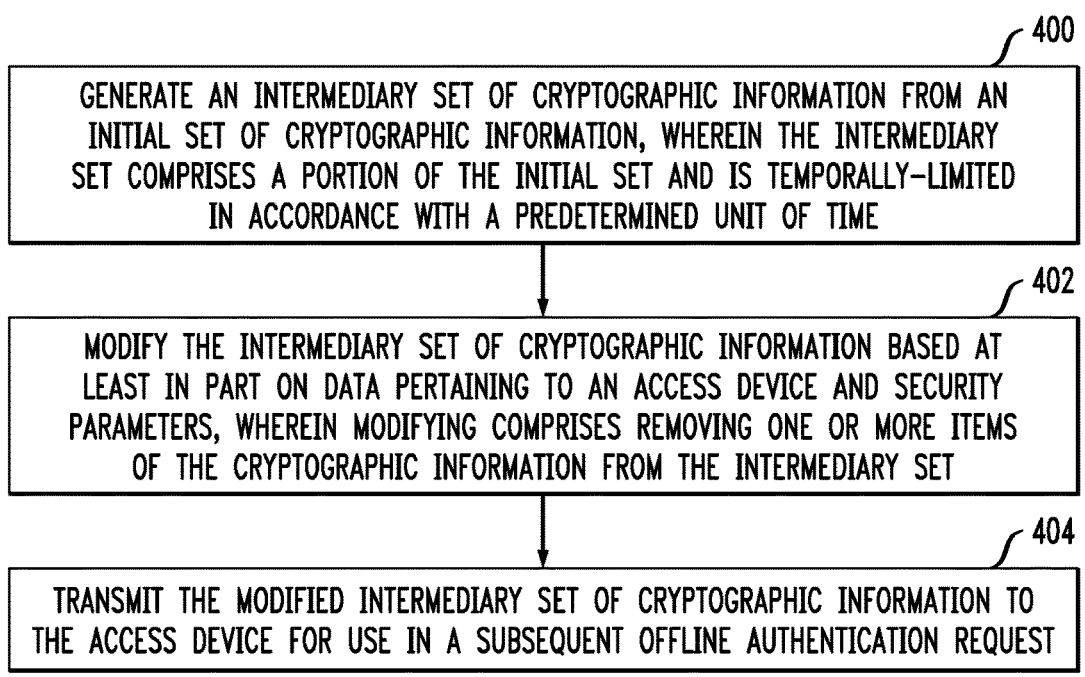
FIG. 4 is a flow diagram of a process for temporary partial authentication value provisioning for offline authentication in an illustrative embodiment.

FIG. 4 is a flow diagram of a process for temporary partial authentication value provisioning for offline authentication in an illustrative embodiment. It is to be understood that this particular process is only an example, and additional or alternative processes can be carried out in other embodiments.

In this embodiment, the process includes steps 400 through 404.

Step 400 includes generating, in response to a request from an access device, an intermediary set of cryptographic information from an initial set of cryptographic information, wherein the intermediary set of cryptographic information comprises a portion of the initial set of cryptographic information and is temporally-limited in accordance with at least one predetermined unit of time. The access device can include a hardware token.

Step 402 includes modifying the intermediary set of cryptographic information based at least in part on data pertaining to the access device and one or more security parameters, wherein modifying the intermediary set of cryptographic information comprises removing one or more items of the cryptographic information from the intermediary set. The data pertaining to the access device can include a serial number of the access device and/or computational power of the access device. Additionally, the one or more security parameters can include one or more risk tolerance parameters.

Step 404 includes transmitting, over a network connection, the modified intermediary set of cryptographic information to the access device for use in a subsequent offline authentication request. Transmitting the modified intermediary set of cryptographic information to the access device can be in response to an authentication of the access device. Additionally, transmitting the modified intermediary set of cryptographic information to the access device can include implementing an online encryption protocol. Further, transmitting the modified intermediary set of cryptographic information to the access device can also include transmitting information pertaining to the one or more items of cryptographic information removed from the intermediary set. The information pertaining to the one or more items of cryptographic information removed can include an identification of the number of cryptographic information removed.

Also, at least one embodiment includes encrypting the modified intermediary set of cryptographic information using a mechanism local to the access device.

Figure 5:
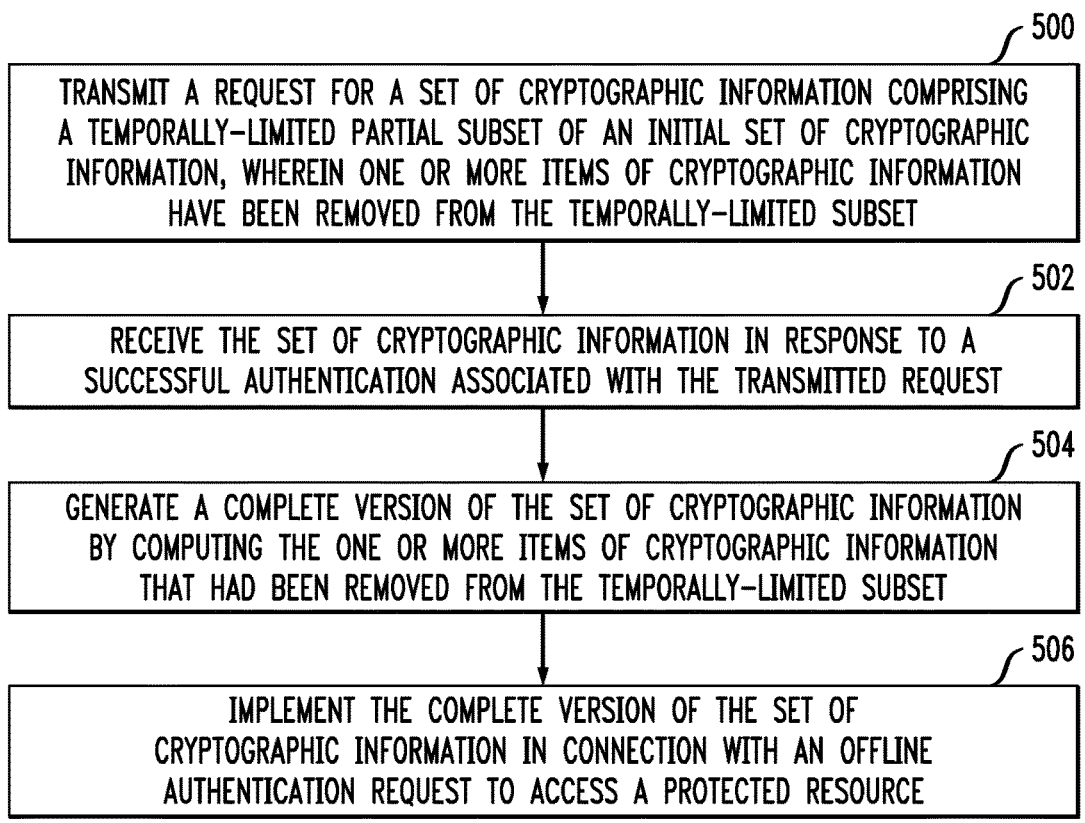
FIG. 5 is a flow diagram of a process for temporary partial authentication value provisioning for offline authentication in an illustrative embodiment.

FIG. 5 is a flow diagram of a process for temporary partial authentication value provisioning for offline authentication in an illustrative embodiment. It is to be understood that this particular process is only an example, and additional or alternative processes can be carried out in other embodiments.

In this embodiment, the process includes steps 500 through 506.

Step 500 includes transmitting a request, to an authentication server over a network connection, for a set of cryptographic information, wherein the set of cryptographic information comprises a temporally-limited partial subset of an initial set of cryptographic information, wherein one or more items of cryptographic information have been removed from the temporally-limited subset.

Step 502 includes receiving the set of cryptographic information in response to a successful authentication associated with the transmitted request. Receiving the cryptographic information can additionally include receiving information pertaining to the one or more items of cryptographic information that have been removed from the temporally-limited subset. The information pertaining to the one or more items of cryptographic information that have been removed can include an identification of the number of cryptographic information removed.

Step 504 includes generating a complete version of the set of cryptographic information by computing the one or more items of cryptographic information that had been removed from the temporally-limited subset. Step 506 includes implementing the complete version of the set of cryptographic information in connection with an offline authentication request to access a protected resource.

Accordingly, the particular processing operations and other functionality described in conjunction with the flow diagrams of FIG. 4 and FIG. 5 are presented by way of illustrative example only, and should not be construed as limiting the scope of the invention in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to generate and implement an intermediary key for validating an OTP value on a user's access device while that device may be unable to connect to the remote service. These and other embodiments can effectively eliminate a connectivity requirement and reduce the amount of data to be transferred between an end-user device and an authentication service and/or server.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems such as Amazon Web Services (AWS), Google Cloud Platform (GCP) and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
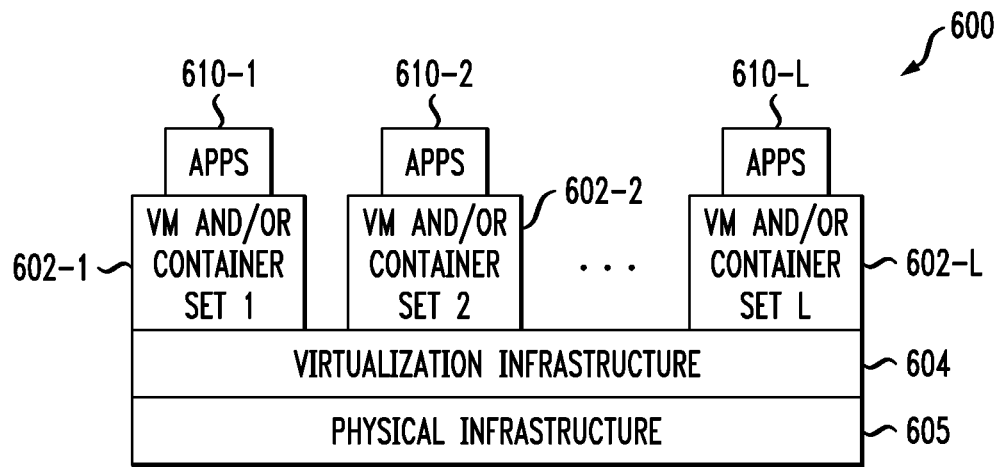
FIGS. 6 and 7 show examples of processing platforms that may be utilized to implement at least a portion of an information processing system in illustrative embodiments.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

Figure 7:
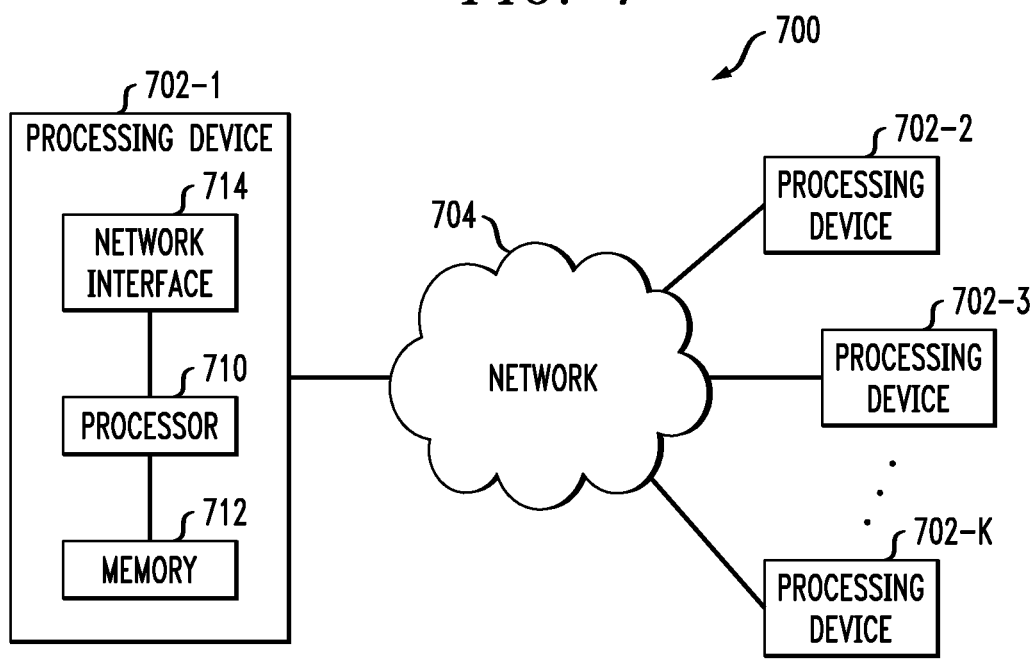

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing platforms, modules, cloud-based systems and resources deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
   generating, in response to a request from an access device, an intermediary set of cryptographic information from an initial set of cryptographic information, wherein the intermediary set of cryptographic information comprises an intermediary seed comprising a portion of the initial set of cryptographic information and is temporally-limited in accordance with at least a portion of a hierarchy of multiple time-based values, wherein at least one of the multiple time-based values in the hierarchy serves as a predecessor for deriving at least one other of the multiple time-based values in the hierarchy;
   modifying the intermediary set of cryptographic information based at least in part on data pertaining to the access device and one or more security parameters, wherein modifying the intermediary set of cryptographic information comprises removing a number of bits of the cryptographic information from the intermediary set, wherein the number of bits removed is adjustable and based at least in part on computational power of the access device; and
   transmitting, over a network connection, the modified intermediary set of cryptographic information to the access device and an identification of the number of bits of cryptographic information removed, for use in a subsequent offline authentication request;
   wherein the method is performed by an authentication server comprising a processor coupled to a memory.

2. The computer-implemented method of claim 1, wherein the access device comprises a hardware token.

3. The computer-implemented method of claim 1, wherein the data pertaining to the access device comprises a serial number of the access device.

4. The computer-implemented method of claim 1, wherein the data pertaining to the access device comprises computational power of the access device.

5. The computer-implemented method of claim 1, wherein the one or more security parameters comprise one or more risk tolerance parameters.

6. The computer-implemented method of claim 1, further comprising:
   encrypting the modified intermediary set of cryptographic information using a mechanism local to the access device.

7. The computer-implemented method of claim 1, wherein transmitting the modified intermediary set of cryptographic information to the access device is in response to an authentication of the access device.

8. The computer-implemented method of claim 1, wherein transmitting the modified intermediary set of cryptographic information to the access device comprises implementing an online encryption protocol.

9. A non-transitory processor-readable storage medium having stored therein program code of one or more software programs, wherein the program code when executed by the authentication server causes the authentication server to carry out the steps of the method of claim 1.

10. An apparatus comprising:
    an authentication server comprising a processor coupled to a memory;
    the authentication server being configured:
       to generate, in response to a request from an access device, an intermediary set of cryptographic information from an initial set of cryptographic information, wherein the intermediary set of cryptographic information comprises an intermediary seed comprising a portion of the initial set of cryptographic information and is temporally-limited in accordance with at least a portion of a hierarchy of multiple time-based values, wherein at least one of the multiple time-based values in the hierarchy serves as a predecessor for deriving at least one other of the multiple time-based values in the hierarchy;
       to modify the intermediary set of cryptographic information based at least in part on data pertaining to the access device and one or more security parameters, wherein modifying the intermediary set of cryptographic information comprises removing a number of bits of the cryptographic information from the intermediary set, wherein the number of bits removed is based at least in part on computational power of the access device; and
       to transmit, over a network connection, the modified intermediary set of cryptographic information to the access device and an identification of the number of bits of cryptographic information removed, for use in a subsequent offline authentication request.

11. A computer-implemented method comprising:
    transmitting a request, to an authentication server over a network connection, for a set of cryptographic information, wherein the set of cryptographic information comprises an intermediary seed comprising a temporally-limited partial subset of an initial set of cryptographic information, wherein a number of bits of cryptographic information have been removed from the temporally-limited subset, wherein the number of bits removed is based at least in part on computational power of an access device associated with transmitting the request, and wherein the partial subset of the initial set of cryptographic information is temporally-limited in accordance with at least a portion of a hierarchy of multiple time-based values, wherein at least one of the multiple time-based values in the hierarchy serves as a predecessor for deriving at least one other of the multiple time-based values in the hierarchy;

receiving, in response to a successful authentication associated with the transmitted request, the set of cryptographic information and an identification of the number of bits of cryptographic information removed;

generating a complete version of the set of cryptographic information by computing the number of bits of cryptographic information that had been removed from the temporally-limited subset; and implementing the complete version of the set of cryptographic information in connection with an offline authentication request to access a protected resource;

wherein the method is performed by the access device, comprising a processor coupled to a memory.

12. A non-transitory processor-readable storage medium having stored therein program code of one or more software programs, wherein the program code when executed by the access device causes the access device to carry out the steps of the method of claim 11.

13. An apparatus comprising:

an access device comprising a processor coupled to a memory;

the access device being configured:

to transmit a request, to an authentication server over a network connection, for a set of cryptographic information, wherein the set of cryptographic information comprises an intermediary seed comprising a temporally-limited partial subset of an initial set of cryptographic information, wherein a number of bits of cryptographic information have been removed from the temporally-limited subset, wherein the number of bits removed is based at least in part on computational power of the access device, and wherein the partial subset of the initial set of cryptographic information is temporally-limited in accordance with at least a portion of a hierarchy of multiple time-based values, wherein at least one of the multiple time-based values in the hierarchy serves as a predecessor for deriving at least one other of the multiple time-based values in the hierarchy;

to receive in response to a successful authentication associated with the transmitted request, the set of cryptographic information and an identification of the number of bits of cryptographic information removed;

to generate a complete version of the set of cryptographic information by computing the number of bits of cryptographic information that had been removed from the temporally-limited subset; and to implement the complete version of the set of cryptographic information in connection with an offline authentication request to access a protected resource.

14. The apparatus of claim 10, wherein the access device comprises a hardware token.

15. The apparatus of claim 10, wherein the data pertaining to the access device comprises a serial number of the access device.

16. The apparatus of claim 10, wherein the data pertaining to the access device comprises computational power of the access device.

17. The apparatus of claim 10, wherein the one or more security parameters comprise one or more risk tolerance parameters.

18. The apparatus of claim 10, wherein the authentication server is further configured:

to encrypt the modified intermediary set of cryptographic information using a mechanism local to the access device.

19. The apparatus of claim 10, wherein transmitting the modified intermediary set of cryptographic information to the access device is in response to an authentication of the access device.

20. The apparatus of claim 10, wherein transmitting the modified intermediary set of cryptographic information to the access device comprises implementing an online encryption protocol.

* * * * *